UNITED STATES PATENT OFFICE.

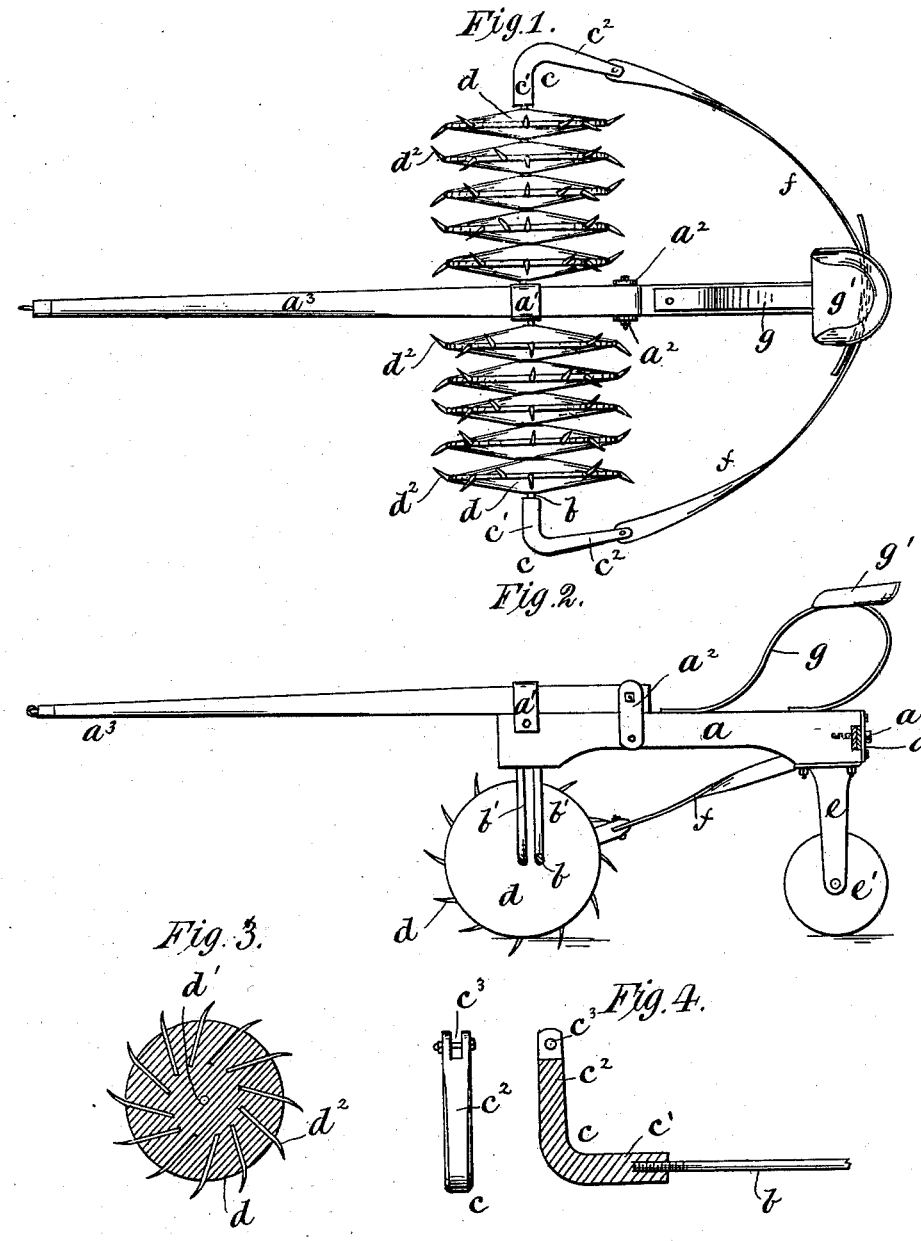

FRANKLIN A. MORAND, OF TOPEKA, KANSAS.

HARROW.

SPECIFICATION forming part of Letters Patent No. 268,924, dated December 12, 1882.

Application filed March 17, 1882. (No model.)

*To all whom it may concern:*

Be it known that I, FRANKLIN A. MORAND, a citizen of the United States, residing at Topeka, in the county of Shawnee and State of Kansas, have invented certain new and useful Improvements in Harrows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in rotary or disk harrows, and has for its object to furnish a harrow with several series of disks provided with teeth, each series being pivoted and capable of being adjusted independently of the others, as will be described.

It consists in the means whereby I independently adjust the series of disks to any working angle desired, and in the means whereby I connect the disk-rod or axle, and in other improvements, all of which will be hereinafter fully described, and pointed out in the claims.

In the drawings, Figure 1 is a plan view, and Fig. 2 is a vertical section, of my improved harrow; and in Figs. 3, 4, and 5 I show detail views of parts thereof.

In carrying out my invention I employ the beam $a$, provided with loop $a'$, extended up near its forward end, and lugs $a^2$, extended up from its sides, slightly in rear of loop $a'$, and connect the tongue $a^3$ to the beam $a$ by passing rear end of tongue through loop $a'$ and between lugs $a^2$, and securing it by a bolt passed through the said lug and tongue, as shown.

$b\ b$ are the axle-rods, which serve as spindles for the disks, hereinafter described. These rods are arranged one on either side of the beam $a$, and their inner or adjacent ends, $b'$, are bent vertically upward and extend into sockets formed in the under side of the forward part of the beam $a$, one of these sockets being arranged slightly in rear of the other, as shown. The outer ends of these axle-rods are screw-threaded, as shown, and are turned into the threaded socket in end of arm $c'$ of L-shaped connecting-bar $c$, hereinafter described. This connection provides a secure joint between the end of the bar $b$ and the L-shaped bar $c$, and at the same time a swiveled connection, so that the arm $c^2$ of bar $c$ may have a free vertical play, as will be hereinafter more fully described.

$d$ are the disks. They are formed convex on their opposite sides, and terminate in a thin or cutting edge at their peripheries. In the center of the disk I provide an eye or opening, $d'$, through which the axle-rod $b$ is passed. $d^2$ are teeth secured to the disks $d$ in any suitable manner, and extended outward from their peripheries at an angle to the peripheries, as shown. These teeth are bent alternately to opposite sides, thus increasing the working-surface of the disk. It will be seen that by placing these teeth at an angle to the periphery, as clearly shown in Figs. 2 and 3, their action on the clods or lumps is cutting rather than crushing, as is the case where the teeth are projected straight from the periphery, and better results are accomplished.

In the rear end of beam $a$, I form a horizontal mortise, extended across the end of said beam. I cover this mortise at the end with plate $a^4$, through which the set-bolt $a^5$ is passed into the end of the beam, for the purpose hereinafter described.

To the under side of the rear end of beam $a$, I secure the bracket $e$, carrying wheel $e'$, which, in connection with the rod $b$ and disks $d$, supports the beam in a proper horizontal position. In the end of arm $c^2$ of L-shaped bar $c$, I form the horizontal slot $c^3$.

$f\ f$ are bars. The forward ends of these bars are pivoted within the slots $c^3$ in bars $c$, and capable of an independent lateral movement, but have no vertical movement except with arm $c^2$ of the said bar $c$. The rear ends of these bars $f$ are provided with a series of perforations. I pass the rear ends of the bars $f$ through the mortise in end of beam $a$, one in rear of the other, as shown in Fig. 2, far enough to bring the axle-rods $b$ to the angle desired, and secure them by screwing the set-bolt $a^5$ through the perforations in said bars $f$ and into the end of beam $a$, as shown. These bars $f$ should be made strong enough to hold the disk-carrying rods in position, and ordinarily I construct them in the arc of a circle, so as to swing readily through the mortise in rear of beam. It will be understood that, when so desired, the bars $f$ may be made to cross each other at the rear, and that where straight rigid bars are employed the said mortise should be so formed as to permit the bars $f$ to be passed back to set the series of disks to the desired angle.

$g$ is the seat-spring. Its rear end is secured to the beam $a$ near the rear end of the latter, and curved rearward and upward, and at its highest part I fix the seat $g'$; thence the forward part of this spring is curved forward and downward, and is secured to the beam $a$ in a line directly forward of the connection of the rear portion. By this construction great elasticity is secured, and the forward and rear portions serve as a brace for each other, and the rear and forward part being secured in a line with each other, the spring is particularly applicable to single-beam harrows or cultivators.

By the screw-thread swivel-connection of the axle-rod $b$ and L-shaped bar $c$, the rear and forward parts of my harrow are readily adapted to slight elevations and depressions without affecting each other.

In the operation of my device, when the several parts are in the position shown in Figs. 1 and 2, and it is desired to set the series of disks at an angle to the line of draft, the advantage of which under certain circumstances is obvious, I loosen the set-bolt $a^5$ and draw the rear ends of bars $f$ through the mortise in end of beam till the desired angle is attained, when I secure them by set-bolt $a^5$, as described. It will be seen that each series of disks may be set at different angles, if so desired.

Having thus described my invention, what I claim, and desire to secure by Letters Patent, is—

1. The combination, substantially as hereinbefore described, of the beam $a$, axle-rods $b$, carrying the disks $d$, L-shaped bars $c$, bars $f$, and mechanism for clamping said bars to beam $a$, as set forth.

2. The combination of the beam $a$, axle-rods $b$, having their inner ends, $b'$, bent upward and working in sockets in under side of beam, disks $d$, L-shaped connecting-bars $c$, bars $f$, set-bolt $a^5$, bracket $e$, and caster-wheel $e'$, all constructed and arranged substantially as described, and for the purposes set forth.

3. In a rotary harrow, a disk having its opposite faces convex and terminating at the periphery in a thin or cutting edge, and having teeth extended outward from the periphery at an angle thereto, and bent alternately to the opposite sides, substantially as set forth.

In testimony whereof I affix my signature in presence of two witnesses.

FRANKLIN A. MORAND.

Witnesses:
C. H. BRADFORD,
H. W. ATKINS.